(12) United States Patent
Grodecki et al.

(10) Patent No.: US 10,789,469 B2
(45) Date of Patent: *Sep. 29, 2020

(54) SOME AUTOMATED AND SEMI-AUTOMATED TOOLS FOR LINEAR FEATURE EXTRACTION IN TWO AND THREE DIMENSIONS

(71) Applicant: DigitalGlobe, Inc., Westminster, CO (US)

(72) Inventors: Jacek Grodecki, Thornton, CO (US); Seth Malitz, Aurora, CO (US); Josh Nolting, Thornton, CO (US)

(73) Assignee: DIGITALGLOBE, INC., Westminster, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/438,384

(22) Filed: Jun. 11, 2019

(65) Prior Publication Data

US 2020/0005017 A1 Jan. 2, 2020

Related U.S. Application Data

(63) Continuation of application No. 15/672,267, filed on Aug. 8, 2017, now Pat. No. 10,318,808, which is a continuation of application No. 14/730,176, filed on Jun. 3, 2015, now Pat. No. 9,727,784.

(60) Provisional application No. 62/007,079, filed on Jun. 3, 2014.

(51) Int. Cl.
*G06K 9/00* (2006.01)
*G06K 9/48* (2006.01)
*G06K 9/46* (2006.01)
*G06K 9/62* (2006.01)
*G06T 17/05* (2011.01)

(52) U.S. Cl.
CPC ......... *G06K 9/0063* (2013.01); *G06K 9/4604* (2013.01); *G06K 9/481* (2013.01); *G06K 9/6253* (2013.01); *G06K 9/00651* (2013.01); *G06T 17/05* (2013.01)

(58) Field of Classification Search
CPC ....... G06K 9/0063; G06K 9/481; G06T 17/05
USPC .................................. 382/154, 197; 345/419
See application file for complete search history.

(56) References Cited

U.S. PATENT DOCUMENTS

| | | | | |
|---|---|---|---|---|
| 6,970,593 | B2 * | 11/2005 | Furukawa ............ | G06K 9/0063 382/154 |
| 7,158,878 | B2 * | 1/2007 | Rasmussen ............ | G01C 21/32 701/431 |
| 7,653,218 | B1 * | 1/2010 | Malitz .................. | G06K 9/0063 382/113 |
| 7,951,950 | B2 * | 5/2011 | Little ................... | C07D 413/06 546/159 |
| 8,429,174 | B2 * | 4/2013 | Ramani .............. | G06K 9/00201 707/749 |
| 9,727,784 | B2 * | 8/2017 | Grodecki ............. | G06K 9/0063 |

(Continued)

*Primary Examiner* — Ping Y Hsieh
(74) *Attorney, Agent, or Firm* — Brian R. Galvin; Galvin Patent Law LLC

(57) ABSTRACT

A system for vector extraction comprising a vector extraction engine stored and operating on a network-connected computing device that loads raster images from a database stored and operating on a network-connected computing device, identifies features in the raster images, and computes a vector based on the features, and methods for feature and vector extraction.

2 Claims, 8 Drawing Sheets

(56) References Cited

U.S. PATENT DOCUMENTS

| | | | | |
|---|---|---|---|---|
| 2009/0309898 A1* | 12/2009 | Nakamura | ............ | G06T 11/203 345/647 |
| 2011/0282578 A1* | 11/2011 | Miksa | .................... | G01C 11/04 701/532 |
| 2014/0133760 A1* | 5/2014 | Chao | .................... | G06T 11/203 382/197 |

* cited by examiner

SOME AUTOMATED AND SEMI-AUTOMATED TOOLS FOR LINEAR FEATURE EXTRACTION IN TWO AND THREE DIMENSIONS

CROSS-REFERENCE TO RELATED APPLICATIONS

| application Ser. No. | Date Filed | Title |
|---|---|---|
| Current application | Herewith | SOME AUTOMATED AND SEMI-AUTOMATED TOOLS FOR LINEAR FEATURE EXTRACTION IN TWO AND THREE DIMENSIONS Is a continuation of: |
| 15/672,267 | Aug. 8, 2017 | SOME AUTOMATED AND SEMI-AUTOMATED TOOLS FOR LINEAR FEATURE EXTRACTION IN TWO AND THREE DIMENSIONS which is a continuation of: |
| 14/730,176 Issued: U.S. Pat. No. 9,727,784 | Jun. 3, 2015 Issue date: Aug. 8, 2017 | SOME AUTOMATED AND SEMI-AUTOMATED TOOLS FOR LINEAR FEATURE EXTRACTION IN TWO AND THREE DIMENSIONS which claims benefit of, and priority to: |
| 62/007,079 | Jun. 3, 2014 | TECHNIQUES FOR VECTOR EXTRACTION | the entire specification of each of which is incorporated herein by reference.

BACKGROUND OF THE INVENTION

Field of the Art

The disclosure relates to the field of linear feature extraction, particularly from remotely-sensed raster data.

Discussion of the State of the Art

In the art of linear feature extraction, ROADTRACKER™ and similar tools enable automated bulk extraction and semi-automated point-to-point extraction of two-dimensional linear feature vectors from remotely-sensed imagery. The extracted vectors represent centerlines of linear features within the image raster. Extractions by these tools are image-based, meaning the image content automatically drives the shapes of extracted vectors. In semi-automated extraction, the raster is displayed in a viewer and extraction is partially guided by user mouse clicks placed along a desired linear feature. Tools like the ROADTRACKER™ can be used to extract centerlines for roads, trails, and hydrology features, and includes automatic smoothing of the vectors and automatic topology cleaning (elimination of gaps (under-shoots) and dangles (over-shoots) where vectors are intended to be perfectly incident to one another.) There are, however, several shortcomings to these tools. One is that although the geometric accuracy of the automated bulk extraction is usually good enough for isolated roads and curved roads, it is often not satisfactory for rectangular city road grids because the extracted centerlines often are not as straight, parallel, or evenly-positioned as desired. Another deficiency is that the tools do not provide any capability for three-dimensional linear feature extraction. And finally, when the semi-automated extraction of a linear feature involves a sequence of more than two mouse clicks, extraction does not commence until placement of the last mouse click. A more preferred behavior would be for the extraction to grow incrementally each time a new mouse click is added to the sequence.

What is needed are the following: a more accurate two-dimensional automated bulk extraction capability to capture rectangular city road grids; a three-dimensional automated and semi-automated linear feature extraction capability that utilizes a digital surface model (DSM) and performs automatic vector smoothing and automatic topology cleaning; a three-dimensional automated and semi-automated linear feature vector extraction capability that utilizes high-resolution stereo imagery and performs automatic vector smoothing and automatic topology cleaning; and finally, whether performing two-dimensional or three-dimensional semi-automated image-based linear feature vector extraction, when the feature extraction involves a sequence of more than two mouse clicks, the extracted vector should grow incrementally each time a new mouse click is added to the sequence.

SUMMARY OF THE INVENTION

Accordingly, the inventor has conceived and reduced to practice, in preferred embodiments, an interface and several methods for vector extraction.

According to a preferred embodiment of the invention, a system for extracting two- and three-dimensional vectors comprising a vector server stored and operating on a network-connected computing device, a raster server stored and operating on a network-connected computing device, a digital surface model (DSM) server stored and operating on a network-connected computing device, a vector extraction engine stored and operating on a network-connected computing device, and a rendering engine stored and operating on a network-connected computing device, is disclosed. According to the embodiment, a vector server may retrieve vectors from and send vectors to a vector storage such as a database or other data storage means (such as, for example, integral or removable hardware-based storage such as a hard disk drive, or software-based storage schema common in the art); a raster server may retrieve raster images from a raster storage, for example such as satellite images or similar raster image data that depict an actual physical environment; a DSM server may retrieve a DSM from a DSM storage, or may compute a DSM from the stereo disparity measurements of a stereo raster image pair retrieved from a raster storage. Retrieved vectors, rasters, and DSM may be provided to a vector extraction engine, which under possible additional user inputs, may extract a plurality of new vectors with respect to a raster image, DSM, and existing vectors, each new vector correlating with a new linear feature in the raster image.

Vectors and rasters may then be provided to a rendering engine, that may form a combined visualization of the two, showing how they relate to each other, such as may be presentable on a viewer such as a display screen, for example for review by a human user. Additionally, a user may interact with the presented visualization using a variety of input devices such as (for example) a computer mouse or keyboard, such as to manipulate the visualization or to indicate or guide where new vectors are to be extracted within the raster or where undesirable existing vectors should be deleted. User input may be received by the rendering engine and utilized to update the rendering appropriately (such as to zoom in or out, for example), or may be further provided from the rendering engine to the vector extraction engine as needed, for example to extract a new vector based on the user input. Newly-extracted vectors may be further provided to the vector server, for example to store the vectors for future reference.

According to another embodiment, a graphical user interface and method such that in performing two-dimensional semi-automated image-based linear feature extraction (as an end in and of itself or as the basis of a three-dimensional linear feature extraction), when the extraction involves a sequence of more than two mouse clicks from the user, the extracted vector grows incrementally each time a new mouse click is added to the sequence, is disclosed.

According to another embodiment of the invention, a system and method for automated two-dimensional vector extraction of city road grids from an image raster, is disclosed.

According to another embodiment of the invention, a system and method for automated and semi-automated three-dimensional linear feature extraction from raster imagery and a DSM is disclosed. The extractions represent the centerlines of the linear features as three-dimensional vectors in the X, Y, Z coordinates of object space. The extraction includes automated smoothing of the vectors and automated topology cleaning.

According to another embodiment of the invention, a system and method for automated and semi-automated three-dimensional linear feature extraction from high-resolution stereo imagery, is disclosed. The extractions represent the centerlines of the linear features as three-dimensional vectors in the X, Y, Z coordinates of object space. The extraction includes automated smoothing of the vectors and automated topology cleaning.

Image-Based Multi-Point Extraction Mode: As an additional embodiment, a semi-automated method for extracting two-dimensional vectors in the manner of "Image-Based Multi-Point Extraction Mode", is disclosed. In this mode, in an initial step, the user may place a mouse-click at location $P_1$ in the a viewer. In subsequent steps, the user may place additional mouse clicks at locations $P_2, P_3, \ldots, P_{k-1}$ in the viewer. And in a final step, the user may indicate the last location in the sequence, $P_k$, with a double mouse click. In each step after the initial step, after clicking at location $P_{j+1}$, a vector extraction from $P_j$ to $P_{j+1}$ is computed (by the vector extraction engine) in real-time (or near real-time) and displayed to the viewer. This extraction is realized as a least-cost path from $P_j$ to $P_{j+1}$ relative to a cost raster derived (possibly on-the-fly, possibly pre-computed) from the image raster in the viewer. While the mouse-cursor location $P_{j+1}$ is in motion, or while the least cost path computation from $P_j$ to $P_{j+1}$ is not yet completed, the vector path from $P_j$ to $P_{j+1}$ may be temporarily depicted in the viewer as a straight line segment. When the double-click occurs at location $P_k$, the consecutive vector paths are concatenated by the vector extraction engine, and the resulting vector may be displayed on the raster in the viewer, and it may be committed to a persistent data store.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

Figure 1:
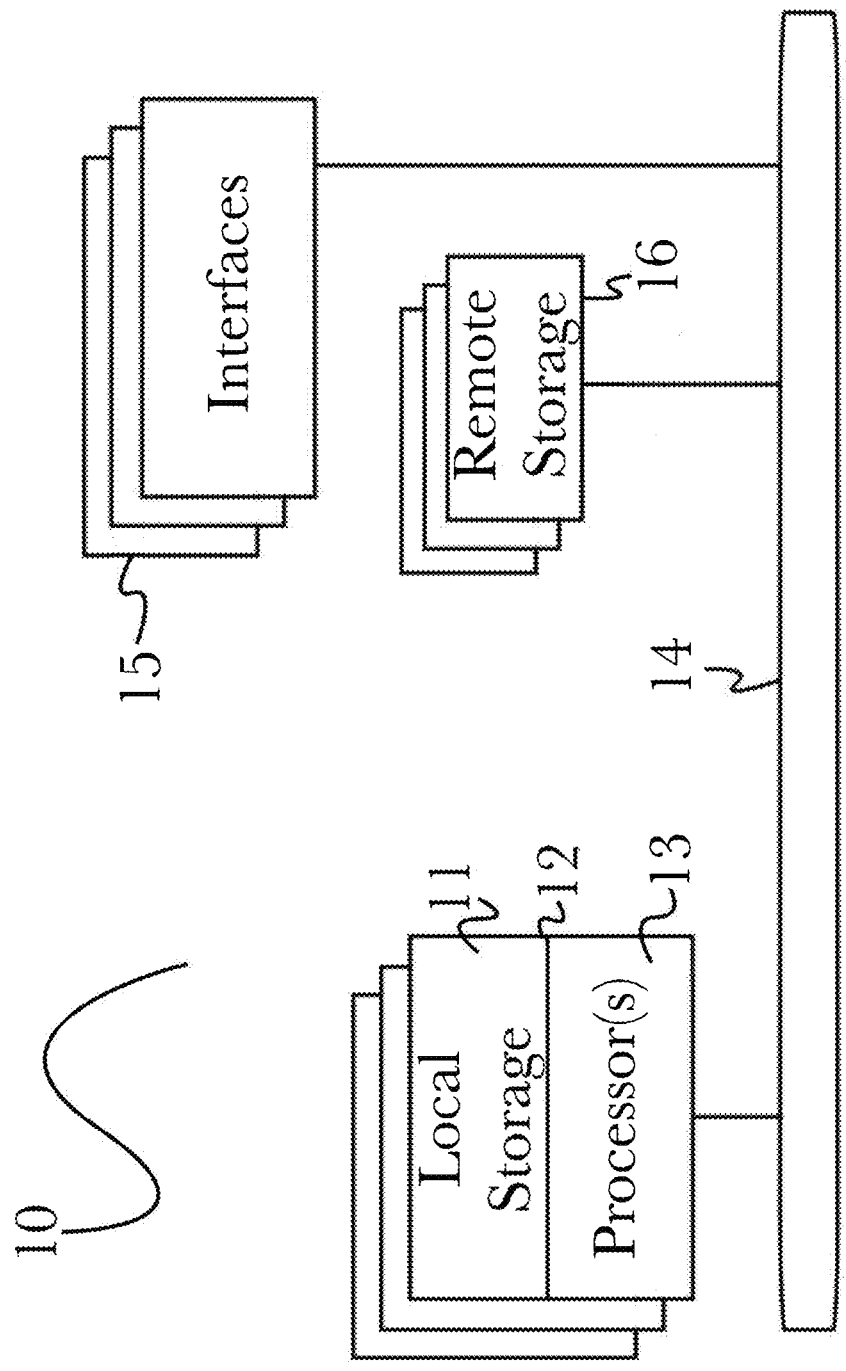
FIG. 1 is a block diagram illustrating an exemplary hardware architecture of a computing device used in an embodiment of the invention.

The inventor has conceived, and reduced to practice, in a preferred embodiment of the invention, an interface and several methods for vector extraction.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity AN hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
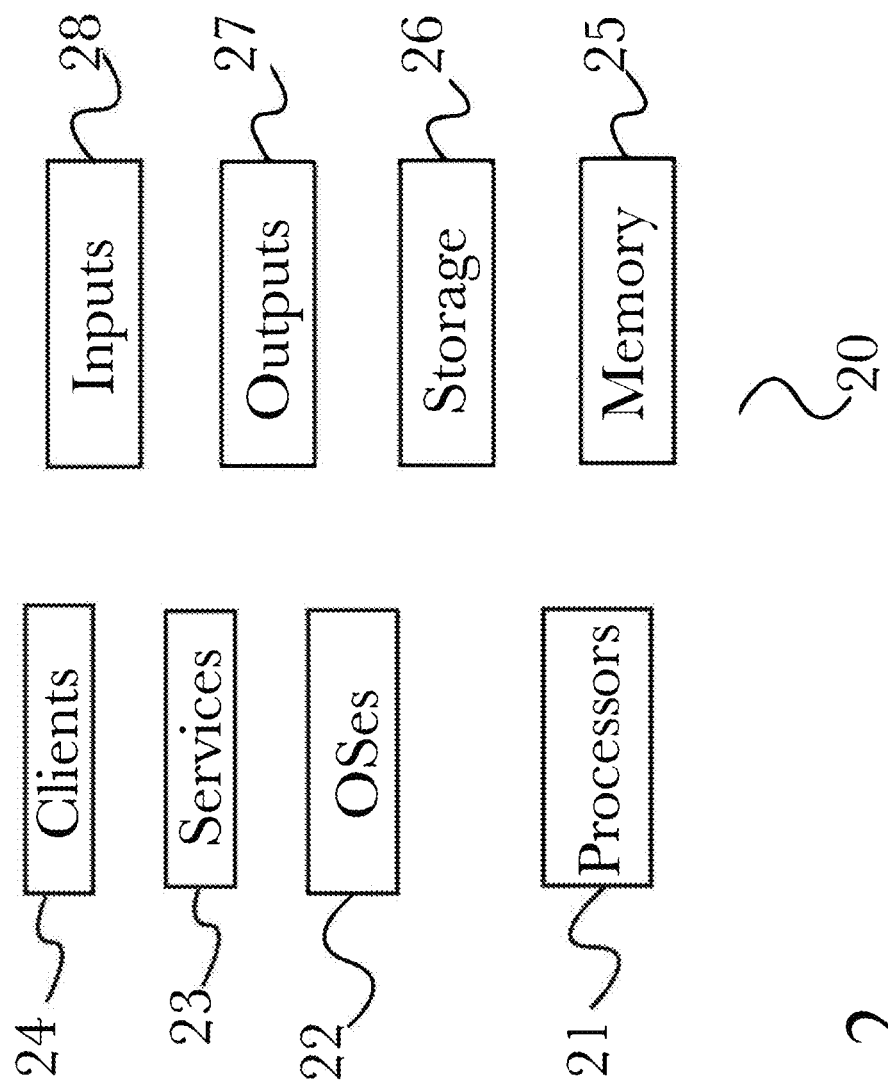
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200, and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

Figure 3:
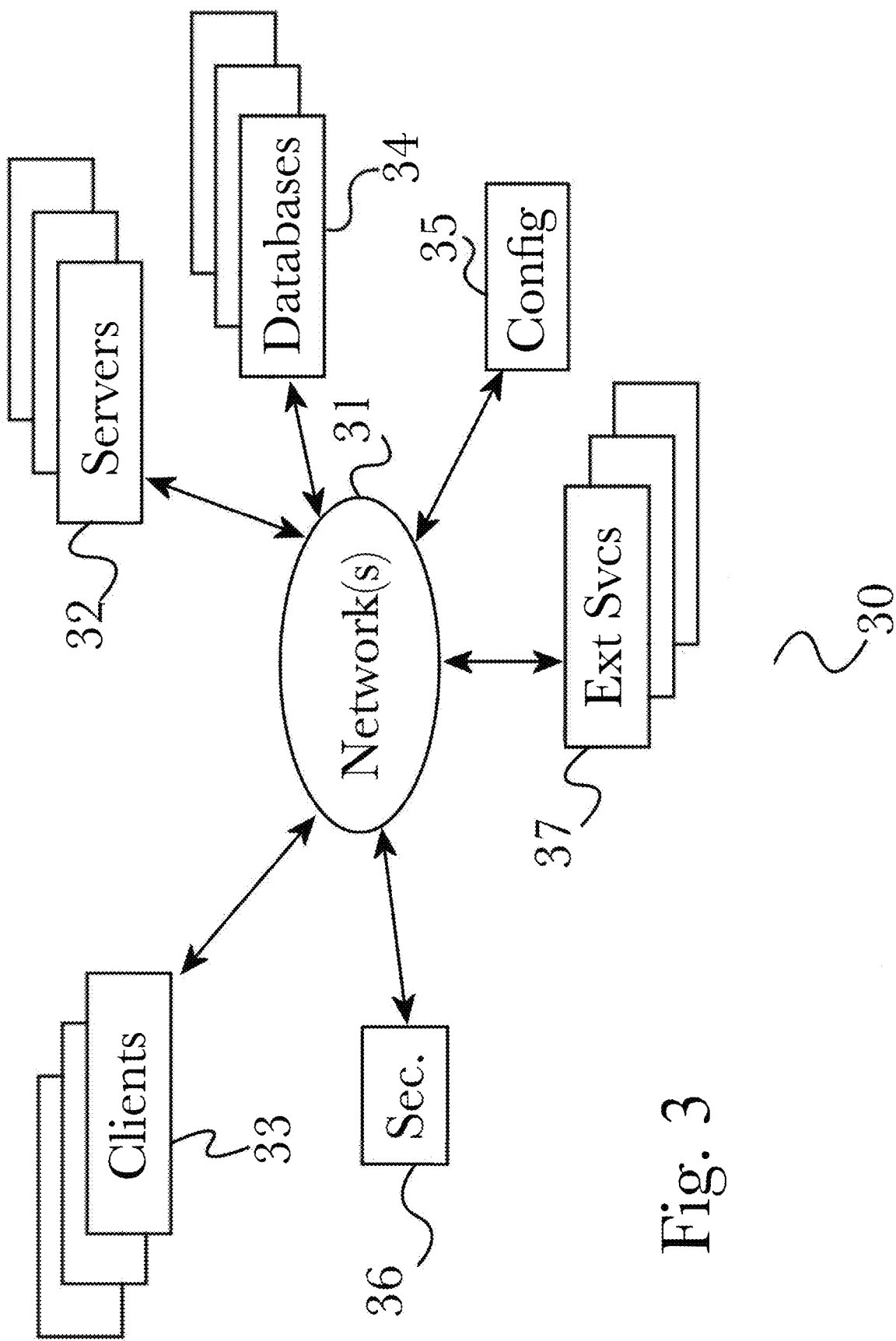
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
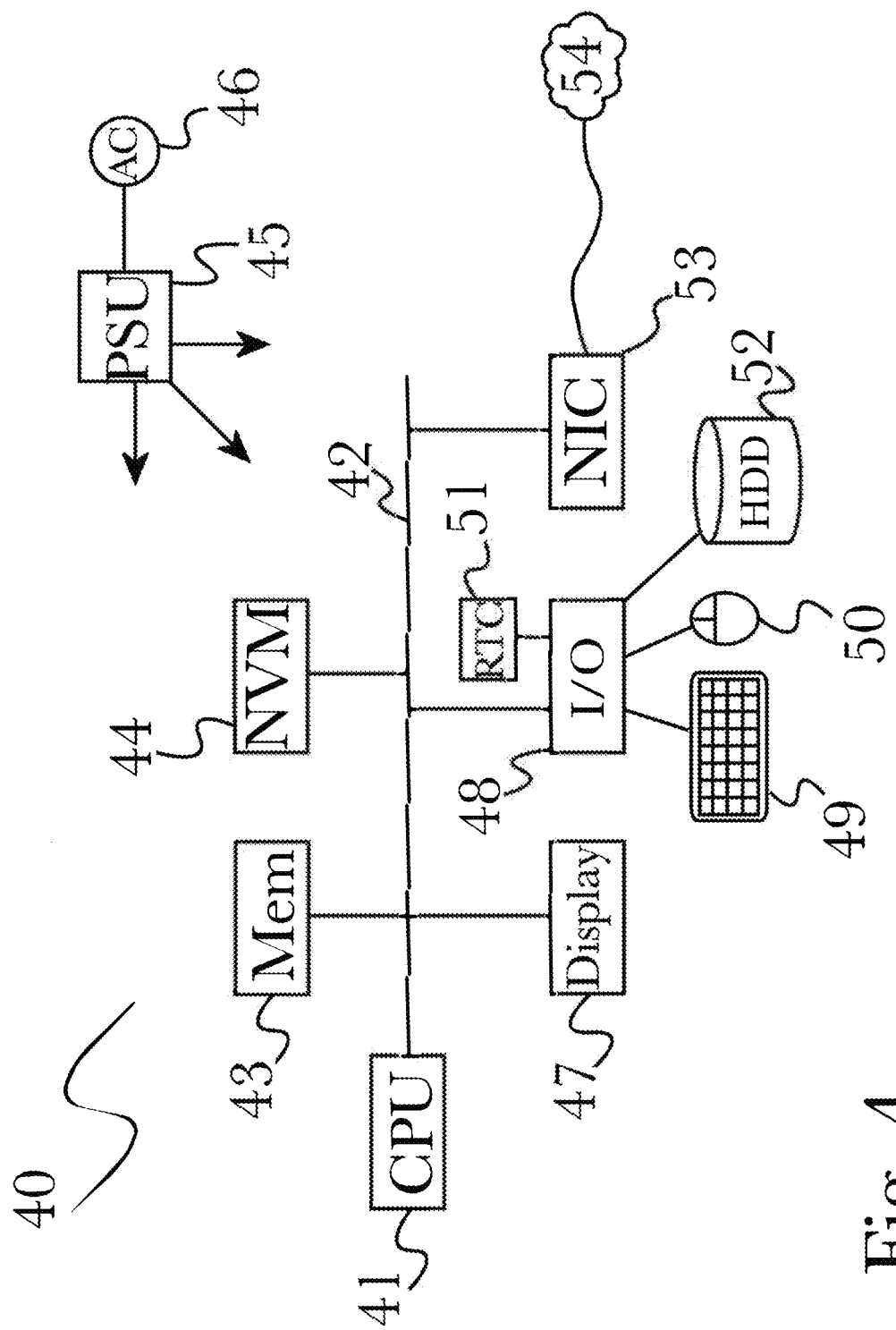
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 5:
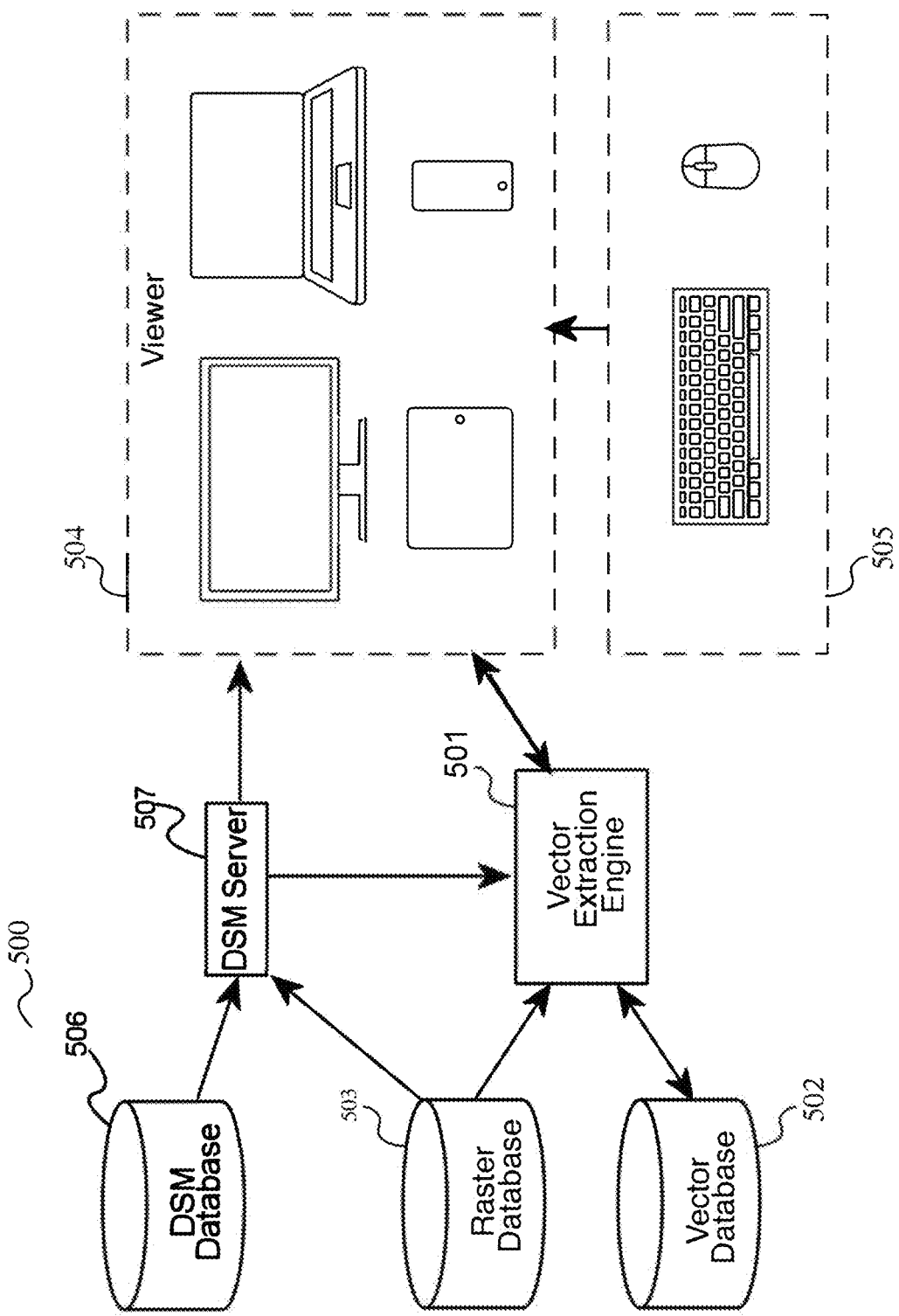
FIG. 5 is a block diagram of an exemplary system architecture for vector extraction, according to a preferred embodiment of the invention.

FIG. 5 is a block diagram illustrating an exemplary system 500 for vector extraction, according to a preferred embodiment of the invention. As illustrated, a vector extraction engine 501 may be stored and operated on a network-connected computing device such as a computer server or workstation As illustrated, vector extraction engine 501 may be connected to a database 502 for raster storage, for example to store and retrieve raster images for vector extraction, and a database 503 for vector storage, such as to store and retrieve extracted vector information. It should also be appreciated that multiple or singular databases may be employed according to the embodiment, for example storing both raster and vector information in a singular data storage.

As further illustrated, a vector display 504 may be used to provide a visual output to a user, for example, to enable user review and to facilitate user interaction via input devices 505 such as to indicate a new linear feature that is to be extracted from a raster image. In this manner, user input is received by the rendering engine and sent to the vector extraction engine 501. Additionally, a digital surface model (DSM) database 506 may be utilized to store and provide DSM information to a DSM server 507, which may provide DSM data for use in vector operations.

It should be appreciated that a variety of connections and interactions may be possible according to the embodiment, such as via a data communication network such as the Internet, facilitating a distributed arrangement where the illustrated components need not necessarily be located within physical proximity of each other, for example in a cloud-based or software as a service (SaaS) arrangement providing the vector extraction utility of the invention to connected users.

Detailed Description of Exemplary Embodiments

Figure 6:
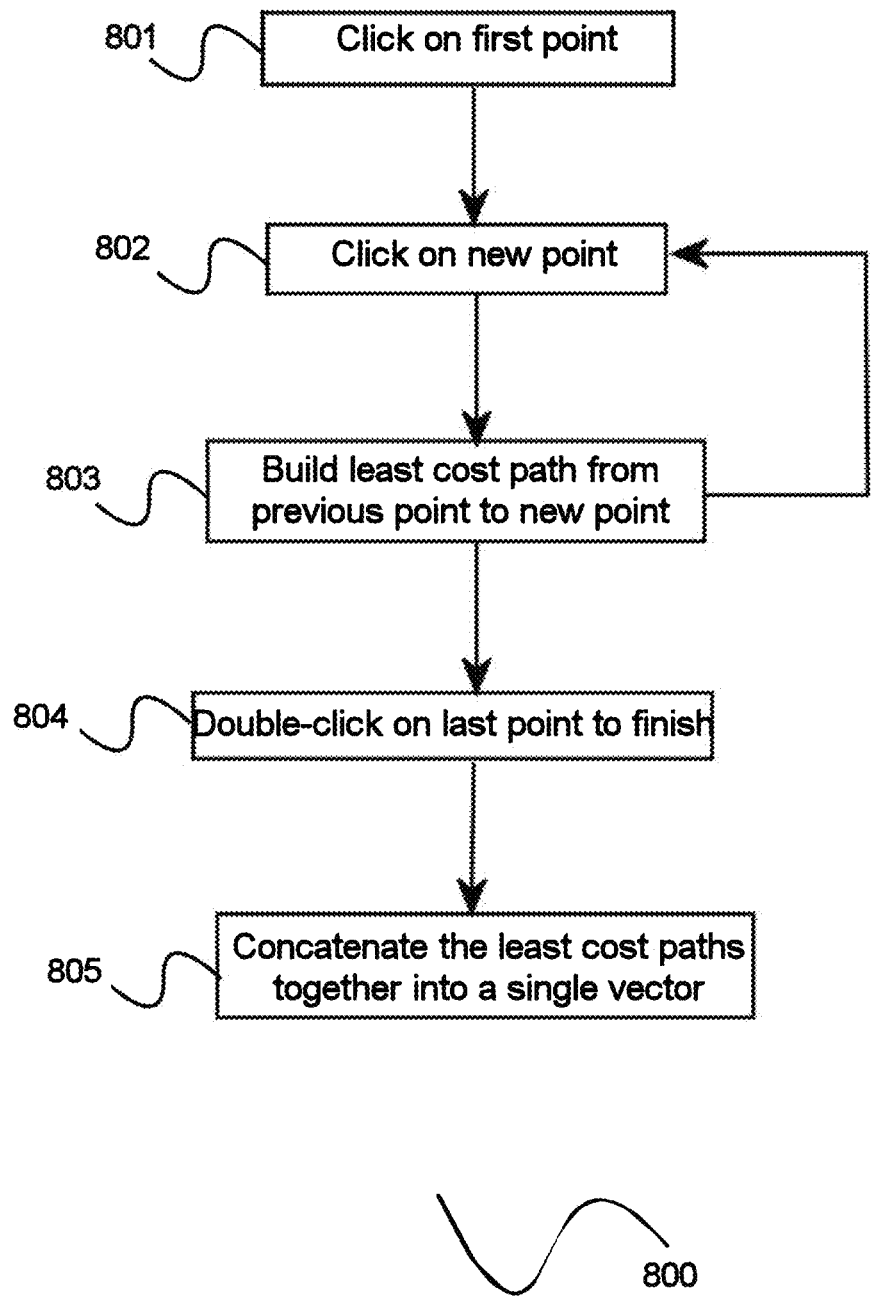
FIG. 6 illustrates a general method for image-based multi-point extraction, according to various embodiments disclosed herein.

FIG. 6 illustrates a general method 800 for image-based semi-automated multi-point extraction of two-dimensional vectors, according to various embodiments disclosed herein. In an initial step 801, a user may click on a first point in a viewer, and in a next step 802 may then click on a new point. In a next step 803 the vector extraction engine may automatically build a least cost path between the two points. Such procedure may continue iteratively wherein a user continues clicking additional points and for each new point clicked, the vector extraction engine automatically builds a least cost path between the new point and the previous point. In a next step 804 a user may "double-click" on a point to indicate it as a final point, and in a final step 805 the least cost paths may be concatenated into a single vector.

Two-Dimensional Linear Feature Extraction of City Road Grids

In all the variations of two-dimensional automated city road grid extraction described below, existing technology may be utilized to perform an initial automated bulk "raw" two-dimensional vector extraction of road centerlines from remotely sensed imagery.

Below are described several exemplary variations on the method of extracting city road grids. The user interface is a viewer showing the raster image of interest. The user can interact with this viewer via input devices (e.g., mouse and keyboard) and graphical tools.

Variation 1: User specifies a constraint region delimiting the desired road grid in the raster image in the viewer, and specifies a line segment along one of the roads so as to indicate one of the two road directions in the extraction. The other road direction will be assumed perpendicular to this line segment. Road grid vectors will be automatically extracted from within the constraint region by the vector extraction engine as follows: Perform initial automatic bulk "raw" vector extraction of road centerlines (e.g., using RoadTracker technology) within the constraint region of the raster image; identify lengthy portions of these vectors where each such portion can be fit tightly (in a least squares sense) with a straight line segment; remove vector portions that are short or that cannot be so fit; remove line segments that are not sufficiently parallel to the user-designated line segment or its perpendicular; identify line segments that belong to the same road based on line segment direction and position; for line segments deemed to be along the same road, fit them with a line segment parallel to the user-designated line segment or its perpendicular. This completes the extraction. The result is displayed in the viewer. The extraction can be saved off to persistent data store.

Variation 2: User specifies a constraint region delimiting the desired road grid in the raster image in the viewer. Road grid vectors will be automatically extracted from within the constraint region by the vector extraction engine as follows: Perform initial automatic bulk "raw" vector extraction of road centerlines within the constraint region of the raster image; identify lengthy portions of these vectors where each such portion can be fit tightly (in a least squares sense) with a straight line segment; remove vector portions that are short or that cannot be so fit; identify the line segments that belong to the same road, based on line segment direction and position; for line segments deemed to be along the same road, fit them with a line segment; let $S_1$ denote a maximal set of line segments that are more or less parallel and let $S_2$ denote a maximal set of line segments that are more or less parallel to each other and more or less perpendicular to $S_1$; identify a single average or median representative road direction for $S_1$ and a single average or median representative road direction for $S_2$, such that the two representative directions are perpendicular to each other; rotate each line segment in $S_1$ about its center point so that it points along the representative direction for $S_1$, and do similarly for the line segments in $S_2$. This completes the extraction. The result is displayed in the viewer. The extraction can be saved off to persistent data store.

Variation 3: User additionally designates that for one road direction in the grid, the extracted road vectors should be not only parallel, but equally-spaced as well. Road grid vectors will be automatically extracted from within the constraint region by the vector extraction engine as follows: First extract initial road grid vectors using Variation 1 or 2 above. Compute the distance between each pair of consecutive roads that parallel to the user-designated road direction and notionally plot the results as points on a horizontal number line. Among these points, identify the cluster that contains the most values, or alternatively, the cluster that contains the smallest value. Compute the median M of this cluster—this value will be taken as the even spacing between roads for the user-designated road direction. Use a standard minimization technique to determine minimal parallel offsets of the road vectors in the initial extraction so that the resulting road vectors are evenly-spaced in increments of M. The minimization may use any of the following objective functions:

sum squared residuals, sum of residual magnitudes, or maximum residual. This completes the extraction. The result is displayed in the viewer. The extraction can be saved off to persistent data store.

Extracted three-dimensional linear feature vectors will be expressed as three-dimensional vectors in the X, Y, Z coordinates of object space. The extraction will include the automated smoothing of the vectors as well as automated topology cleaning.

Figure 7A:
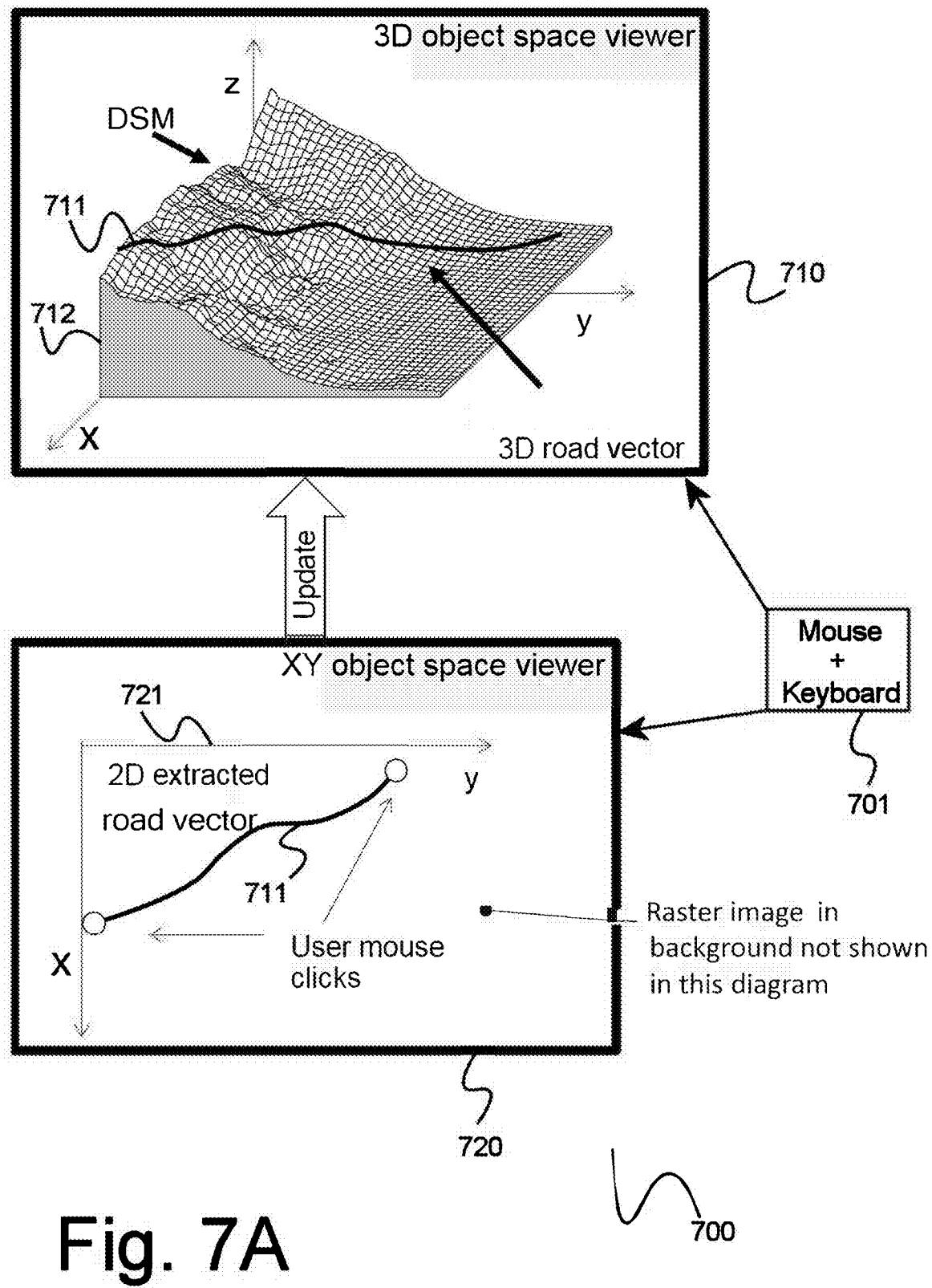
FIG. 7A is an illustration of an exemplary graphical user interface for three-dimensional vector extraction and monoscopic three-dimensional viewing

According to another embodiment of the invention, FIG. 7A is a diagram illustrating a monoscopic graphical user interface 700 tied to a vector extraction engine (the latter not shown in the figure): enabling the user to extract three-dimensional linear feature vectors corresponding to the centerlines of three-dimensional linear features given by a raster image and DSM; enabling the user to view extracted vectors against a digital surface model (DSM) for three-dimensional context; enabling the user in semi-automated mode to guide the extraction of a particular linear feature, for example using connected mouse and keyboard 701; enabling the user to commit extracted vectors to a persistent data store; enabling the user to delete undesirable extracted vectors. The system may incorporate two-dimensional image-based and non-image-based linear feature extraction as part of the process of extracting three-dimension linear feature vectors. The user interface 700 may comprise a plurality of synchronized graphical viewers such as:

- A three-dimensional viewer 710 that may display the three-dimensional vectors 711 against a digital surface model (DSM) 712 or, optionally, against an empty three-dimensional object space. The viewer may optionally offer perspective or non-perspective viewing, and enable the user to pan, zoom, and yaw about the line of sight. The DSM 712 may be opaque or semi-transparent or represented as a wireframe. A semi-transparent DSM 712 may allow a user to see where a three-dimensional vector 711 lies above or below the landscape represented by the DSM 712.
- A two-dimensional XY-viewer 720 may display the three-dimensional vectors 711 projected vertically to the XY-plane 721 of a raster image. The viewer may, as above, support pan, zoom, and yaw about the line of sight. Projected vectors 711 as shown in the viewer 720 may be user-selectable, for example, to indicate corresponding three-dimensional vectors to be deleted.

For automated bulk image-based three-dimensional linear feature extraction, a vector extraction engine first extracts two-dimensional XY-vectors from the raster image via, say, the automated version of the ROADTRACKER™ (which also takes care of smoothing and topology cleaning of extracted two-dimensional vectors.) These extracted two-dimensional vectors may then be displayed in the XY-image viewer. The vector extraction engine then automatically projects each two-dimensional XY-vector vertically along the Z-axis to the DSM (or slightly above it), and automatically smooths it in the Z-dimension. For the most part, the resulting three-dimensional vector may ride slightly above the DSM. Care is taken by the vector extraction engine to ensure that when two-dimensional extracted vectors are incident in the XY plane, their projected, three-dimensional, smoothed versions are incident as three-dimensional vectors. Thus the connection topology of the three-dimensional vectors is the same as that of the two-dimensional vectors. The extracted three-dimensional vectors may be displayed in the three-dimensional viewer.

For semi-automated image-based three-dimensional linear feature extraction, the user may designate, with mouse clicks, two or more points on the image raster in the XY-Viewer. A vector extraction engine may first extract the vector two-dimensionally (the extracted vector passing through all the user-designated mouse-click points) in image-based fashion from the image raster via, say, the semi-automated version of the ROADTRACKER™. The extracted two-dimensional vector may then be displayed in the XY image viewer. The vector extraction engine then automatically projects the newly extracted two-dimensional XY vector vertically along the Z axis to the DSM (or slightly above it) and automatically smooths it in the Z-dimension. For the most part, the resulting three-dimensional vector may ride slightly above the DSM. Care is taken by the vector extraction engine to ensure that whenever the two-dimensional version of the new vector is incident to another two-dimensional vector in the XY plane, the three-dimensional versions of both vectors are also incident. Thus the connection topology of the three-dimensional vectors remains the same as that of the two-dimensional vectors. The extracted three-dimensional vector may be displayed in the three-dimensional viewer.

Figure 7B:
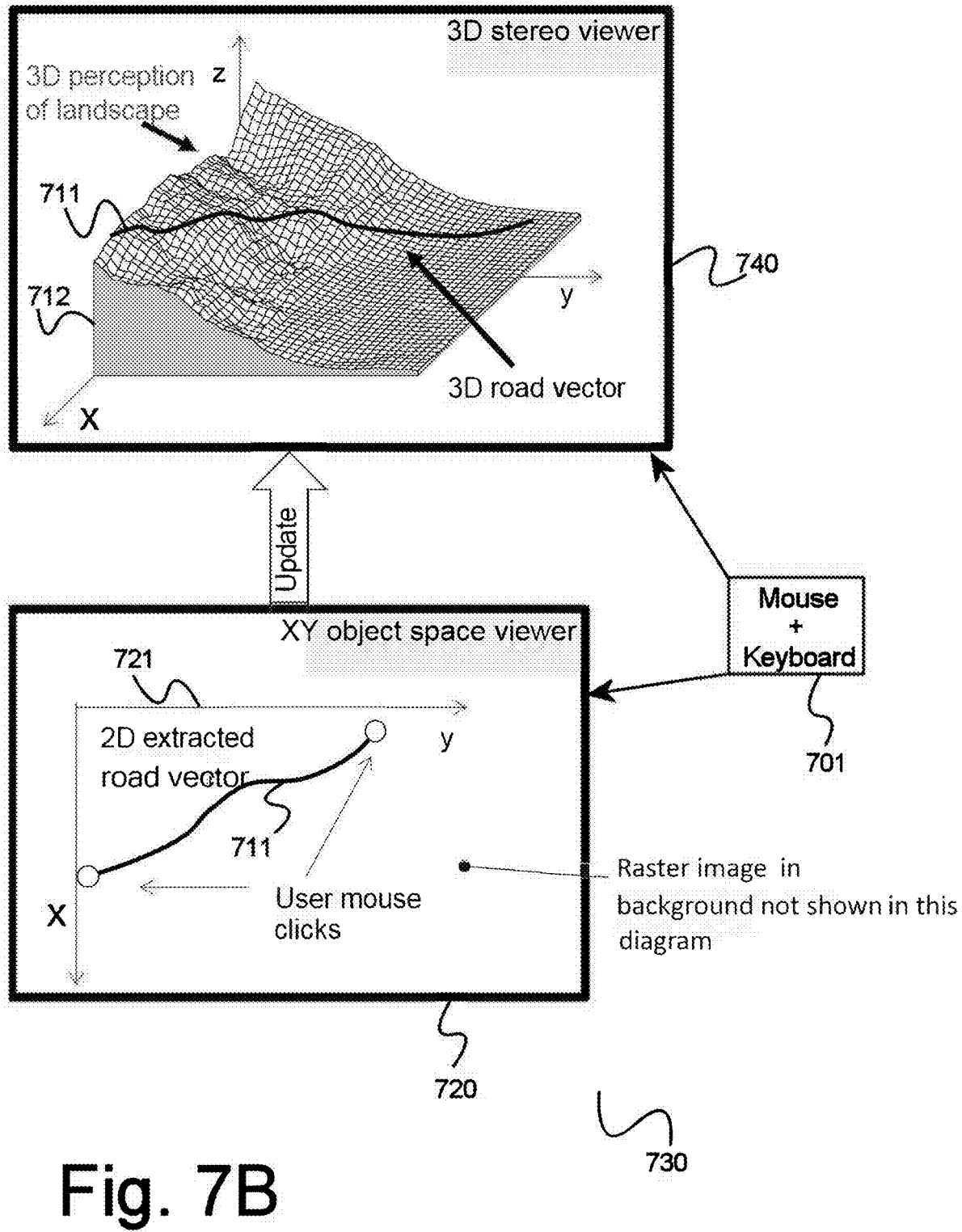
FIG. 7B is an illustration of an exemplary graphical user interface for three-dimensional vector extraction and stereoscopic three-dimensional viewing

According to another embodiment of the invention, FIG. 7B is a diagram illustrating a stereoscopic graphical user interface 730 tied to a vector extraction engine (the latter not shown in the figure): enabling the user to extract three-dimensional linear feature vectors corresponding to the centerlines of three-dimensional linear features given by a stereo raster image pair; enabling the user to view extracted vectors in a three-dimensional stereo context; enabling the user in semi-automated mode to guide the extraction of a particular linear feature via, say, mouse clicks; enabling the user to commit extracted vectors to a persistent data store; enabling the user to delete undesirable extracted vectors. The system may incorporate two-dimensional image-based and non-image-based linear feature extraction as part of the process of extracting three-dimension linear feature vectors. The user interface 730 may comprise a plurality of graphical viewers such as:

- A stereo three-dimensional viewer 740 displaying the three-dimensional vectors against a (possibly semi-transparent) stereo view of the landscape. It may be possible for a user to see where a vector lies above or below the perceived landscape. The viewer supports pan, zoom, and yaw about line of sight.
- A monoscopic XY-image viewer 720, showing an orthorectified version of one of the raster images of the stereo image pair. (The manner of the orthorectification is explained below.) The viewer may enable the user to pan, zoom, and yaw about line of sight. Extracted two-dimensional vectors in the viewer may be user-selectable, for example, to indicate that their corresponding three-dimensional vectors are to be deleted.

In the stereo extraction system, orthorectification of the raster image in the XY image viewer may be based on a digital surface model (DSM) automatically constructed from the stereo image pair via automatically computed stereo disparity measurements. If we are dealing with high-resolution stereo imagery, the resulting DSM will have reasonable geospatial accuracy.

In the stereo viewing and extraction system, the aforementioned orthorectified raster and DSM may be employed in the same way as in the monoscopic viewing and extraction system in that after automated or semi-automated two-dimensional extraction from the orthorectified raster in the XY plane is performed, the extracted two-dimensional vectors are projected vertically along the Z-axis to the DSM. In the stereo system, the two-dimensional extracted vectors may be displayed in the monoscopic XY viewer and the corresponding three-dimensional vectors may be displayed in the stereo viewer.

The skilled person will be aware of a range of possible modifications of the various embodiments described above. Accordingly, the present invention is defined by the claims and their equivalents.

What is claimed is:

1. A system for three-dimensional vector extraction from imagery of a surface, comprising:
 a vector extraction engine operating on a computing device or network of computing devices;
 wherein the vector extraction engine:
  builds a first raster;
  builds a second raster based at least in part on the first raster;
  combines the first and second rasters to form a new three-dimensional raster;
  identifies image features in at least one of the first and second rasters;
  computes instantaneous values for the identified features;
  calculates a vector based at least in part on the instantaneous values; and
  projects the vector onto the new three-dimensional raster.

2. A method for three-dimensional vector extraction from image data of a surface, comprising the steps of:
 building, using a vector extraction engine operating on a computing device or network of computing devices, a first raster;
 building a second raster based at least in part on the first raster; and
 combining the first and second rasters to form a three-dimensional raster;
 identifying, using a vector extraction engine stored and operating on a workstation computer, image features in at least one of the first and second rasters;
 computing instantaneous values for the identified features;
 calculating a vector based at least in part on the instantaneous values; and
 projecting the vector onto the three-dimensional raster.

* * * * *